US012562667B2

(12) United States Patent (10) Patent No.: US 12,562,667 B2
Sorkin et al. (45) Date of Patent: Feb. 24, 2026

(54) STARTER-GENERATOR CONTROL UNIT (SGCU) RANDOMIZED CURRENT FEEDBACK CONTROL

(71) Applicant: SAFRAN POWER USA, LLC, Twinsburg, OH (US)

(72) Inventors: Lev Sorkin, Twinsburg, OH (US); Cory Ackerman, Twinsburg, OH (US)

(73) Assignee: SAFRAN POWER USA, LLC, Twinsburg, OH (US)

( * ) Notice: Subject to any disclaimer, the term of this patent is extended or adjusted under 35 U.S.C. 154(b) by 143 days.

(21) Appl. No.: 17/922,868

(22) PCT Filed: May 6, 2020

(86) PCT No.: PCT/US2020/031668
§ 371 (c)(1),
(2) Date: Nov. 2, 2022

(87) PCT Pub. No.: WO2021/225590
PCT Pub. Date: Nov. 11, 2021

(65) Prior Publication Data
US 2023/0170834 A1 Jun. 1, 2023

(51) Int. Cl.
*H02P 23/30* (2016.01)
*H02P 7/29* (2016.01)
(Continued)

(52) U.S. Cl.
CPC .............. *H02P 27/085* (2013.01); *H02P 7/29* (2013.01)

(58) Field of Classification Search
CPC .. H02P 6/10; H02P 21/18; H02P 27/08; H02P 21/06; H02P 21/22; H02P 25/089;
(Continued)

(56) References Cited

U.S. PATENT DOCUMENTS 5,592,058 A * 1/1997 Archer ..................... F24F 11/52
318/400.11
6,505,594 B1 1/2003 Katayama et al.
(Continued)

FOREIGN PATENT DOCUMENTS

CN 110190798 A 8/2019

OTHER PUBLICATIONS

U.S. Notice of Allowance from corresponding U.S. Appl. No. 17/922,881, dated May 12, 2023, 16 pages.
International Search Report and Written Opinion, International Application No. PCT/US2020/031668, dated Dec. 22, 2020, 16 pages.
Luca Sgarbossa "Advanced Topics on Motor Drives for Emerging Mechatronic Applications", Jan. 31, 2008, XPO55758965, 112 pages.
(Continued)

*Primary Examiner* — Kawing Chan
*Assistant Examiner* — Charles S Laughlin
(74) *Attorney, Agent, or Firm* — Kilpatrick Townsend & Stockton LLP

(57) ABSTRACT
According to one aspect, a starter-generator control unit may include a comparator, a pulse width modulation (PWM) duty cycle generator, a randomizer, and a sequencer. The comparator may receive a current reading from a current sensor and a target current from a target current lookup table and generate an output comparator signal indicative of an increase or a decrease in a current value of a pulse width modulation (PWM) duty cycle. The PWM duty cycle generator may receive the signal from the comparator and generate an output PWM signal. The randomizer may generate a randomly time-varying update signal. The PWM duty cycle generator may receive the randomly time-varying update signal which may control a cycle time associated with the PWM duty cycle generator. The sequencer may receive the output PWM signal and generate a gate control signal for controlling an inverter based on the output PWM signal.

20 Claims, 2 Drawing Sheets

(51) Int. Cl.
  *H02P 27/08*    (2006.01)
  *H02P 29/20*    (2016.01)

(58) Field of Classification Search
  CPC .... H02P 6/16; H02P 6/18; H02P 21/05; H02P
    6/183; H02P 23/14; H02P 6/08; H02P
    21/09; H02P 21/13; H02P 21/16; H02P
    2101/30; H02P 2209/07; H02P 6/17;
    H02P 21/00; H02P 21/0003; H02P
    21/0007; H02P 21/14; H02P 21/24; H02P
    23/0004; H02P 23/12; H02P 25/08; H02P
    25/092; H02P 25/0925; H02P 25/098;
    H02P 25/22; H02P 29/0241; H02P
    29/032; H02P 29/50; H02P 6/182; H02P
    6/34; H02P 27/085; H02P 6/06; H02P
    6/15; H02P 6/28; H02P 21/0021; H02P
    21/04; H02P 21/12; H02P 21/20; H02P
    21/26; H02P 2201/03; H02P 2203/11;
    H02P 2205/05; H02P 23/0077; H02P
    23/04; H02P 25/03; H02P 25/086; H02P
    27/047; H02P 27/12; H02P 29/024; H02P
    29/027; H02P 29/028; H02P 29/64; H02P
    29/662; H02P 29/68; H02P 6/085; H02P
    6/185; H02P 9/02; H02P 9/30; H02P
    1/46; H02P 21/0025; H02P 21/08; H02P
    21/34; H02P 29/40; H02P 3/14; H02P
    6/14; H02P 6/24; H02P 6/32; H02P 7/29;
    H02P 9/08; H02P 9/123; H02P 9/40
  See application file for complete search history.

(56)         References Cited

U.S. PATENT DOCUMENTS

| | | | |
|---|---|---|---|
| 7,448,220 | B2 | 11/2008 | Schmidt et al. |
| 2007/0222220 | A1 | 9/2007 | Huang et al. |
| 2010/0295492 | A1* | 11/2010 | Chakrabarti ......... B60L 3/0038 |
| | | | 180/65.285 |
| 2013/0127412 | A1 | 5/2013 | Wiese |
| 2015/0316016 | A1 | 11/2015 | Nakashima |
| 2016/0138549 | A1 | 5/2016 | Kuniyoshi et al. |
| 2020/0318553 | A1 | 10/2020 | Dixon et al. |
| 2022/0166362 | A1* | 5/2022 | Yamasaki ............... H02P 27/08 |

OTHER PUBLICATIONS

Baratieri, et al. "A Novel Starting Method for Sensorless Brushless DC Motors with Current Limitation", Sep. 2, 2012, International Conference on Electrical Machines, 7 pages.
Chinese Application No. 202080100597.0, Office Action mailed on Mar. 31, 2025, 15 pages. (4 pages of English Translation and 11 pages of Original Copy).
European Application No. 20729367.1, Office Action mailed on Feb. 4, 2025, 4 pages.
International Application No. PCT/US2020/031668, International Preliminary Report on Patentability mailed on Nov. 17, 2022, 9 pages.
Chinese Application No. 202080100597.0, Office Action mailed on Sep. 11, 2025, 12 pages (10 pages of original document and 2 pages of English Translation).

\* cited by examiner

200

Receiving current reading and target current          202

Generating output comparator signal based on comparison          204

Generating output PWM signal          206

Generating via randomizer randomly time-varying update signal controlling cycle time for PWM duty cycle generator          208

Generating gate control signal for controlling inverter based on output PWM signal          210

STARTER-GENERATOR CONTROL UNIT (SGCU) RANDOMIZED CURRENT FEEDBACK CONTROL

BACKGROUND

Efficient and powerful electrical starter-generators (SG) are generally desired. Different types of SG exist, such as brush-type SGs and brushless-type SGs. Brushless-type SGs may be controlled using brushless motor control algorithms. Typically, SG controllers control the SG by using relative rotor and/or stator position information and phase current and/or voltage information to control an inverter pulse width modulation (PWM). With a given direct current (DC) power source voltage supplied to the inverter, the motor torque is controlled by controlling an output voltage leading angle and by controlling current.

Adjusting the phase currents based on the current feedback is performed at given, constant intervals. During the engine start, SG speed changes from 0 rpm to a start cutoff speed rpm or a threshold rpm. This effectively creates a frequency sweep applied to the SG, gearbox, and engine system. However, a high probability exists that the interaction between the constant feedback control update frequency, the engine acceleration, and the system mechanical resonances which may create an unstable SG operation. Resonance may occur when the control loop adjusts the inverter PWM during the engine acceleration at regular, equal intervals. Such resonant behavior can result in an unsuccessful engine start, resulting in a start abort, or may result in shearing of the generator shaft.

Further, the typical approach frequently requires an intensive software control algorithm that actively adjusts the control parameters (i.e., the current and the leading angle) in order to avoid resonant behavior. Another disadvantage of such method is the associated complexity and the reliance on software.

BRIEF DESCRIPTION

According to one aspect, a starter-generator control unit may include a comparator, a pulse width modulation (PWM) duty cycle generator, a randomizer, and a sequencer. The comparator may receive a current reading from a current sensor and a target current from a target current lookup table and generate an output comparator signal indicative of an increase or a decrease in a current value of a pulse width modulation (PWM) duty cycle based on a comparison between the current reading and the target current. The PWM duty cycle generator may receive the signal from the comparator and generate an output PWM signal. The randomizer may generate a randomly time-varying update signal. The PWM duty cycle generator may receive the randomly time-varying update signal and the randomly time-varying update signal may control a cycle time associated with the PWM duty cycle generator. The sequencer may receive the output PWM signal and generate a gate control signal for controlling an inverter based on the output PWM signal.

The starter-generator control unit may include a clock driving the randomizer. The clock may be a pseudo-random clock. The sequencer may receive a positional angle associated with a starter-generator driven by the inverter and generate the gate control signal for controlling the inverter based on the positional angle. The starter-generator control unit may receive a rotational speed associated with a starter-generator driven by the inverter. The target current from the target current lookup table may be determined by the starter-generator control unit based on the rotational speed associated with the starter-generator driven by the inverter. The starter-generator may include a resolver determining the rotational speed. The rotational speed may be a time derivative of a positional angle associated with the starter-generator. The inverter may be associated with N number of phases. The output comparator signal may be associated with an increment or a decrement.

According to one aspect, a system for starter-generator control unit randomized current feedback control may include a comparator, a pulse width modulation (PWM) duty cycle generator, a randomizer, an inverter, and a sequencer. The comparator may receive a current reading from a current sensor and a target current from a target current lookup table and generate an output comparator signal indicative of an increase or a decrease in a current value of a pulse width modulation (PWM) duty cycle based on a comparison between the current reading and the target current. The PWM duty cycle generator may receive the signal from the comparator and generate an output PWM signal. The randomizer may generate a randomly time-varying update signal. The PWM duty cycle generator may receive the randomly time-varying update signal and the randomly time-varying update signal may control a cycle time associated with the PWM duty cycle generator. The sequencer may receive the output PWM signal and generate a gate control signal for controlling an inverter based on the output PWM signal.

The system for starter-generator control unit randomized current feedback control may include a clock driving the randomizer. The clock may be a pseudo-random clock. The sequencer may receive a positional angle associated with a starter-generator driven by the inverter and generates the gate control signal for controlling the inverter based on the positional angle. The starter-generator control unit may receive a rotational speed associated with a starter-generator driven by the inverter. The target current from the target current lookup table may be determined by the starter-generator control unit based on the rotational speed associated with the starter-generator driven by the inverter. The starter-generator may include a resolver determining the rotational speed. The rotational speed may be a time derivative of a positional angle associated with the starter-generator. The inverter may be associated with N number of phases.

A method for starter-generator control unit randomized current feedback control may include receiving, using a comparator, a current reading from a current sensor and a target current from a target current lookup table and generating an output comparator signal indicative of an increase or a decrease in a current value of a pulse width modulation (PWM) duty cycle based on a comparison between the current reading and the target current, receiving, using a PWM duty cycle generator, the signal from the comparator and generating an output PWM signal, generating, using a randomizer, a randomly time-varying update signal, and receiving, using the PWM duty cycle generator, the randomly time-varying update signal. The randomly time-varying update signal may control a cycle time associated with the PWM duty cycle generator. The method may include receiving, using a sequencer, the output PWM signal and generating a gate control signal for controlling the inverter based on the output PWM signal.

DETAILED DESCRIPTION

Brushless-type starter-generators (SG) may be controlled using brushless motor control algorithms. Brushless motor control algorithms may be optimized to efficiently drive brushless generators when the brushless SG are operating in a starter operating mode.

Brushless SGs may generally be optimized for operation in a generate mode, since brushless SGs typically operate in the generate mode greater than 90% of the time. According to one aspect, a starter-generators control unit (SGCU) may be designed to provide high starting torques by implementing a SG controller which uses randomized current feedback to control the SG. In other words, instead of using regular, equal pulse width modulation (PWM) adjustment intervals, the systems and techniques described herein implement irregular adjustment intervals, which may be governed by a pseudo-random clock, implemented as hardware. In this way, starting system resonant behavior may be mitigated, thereby improving engine and SG reliability.

Figure 1:
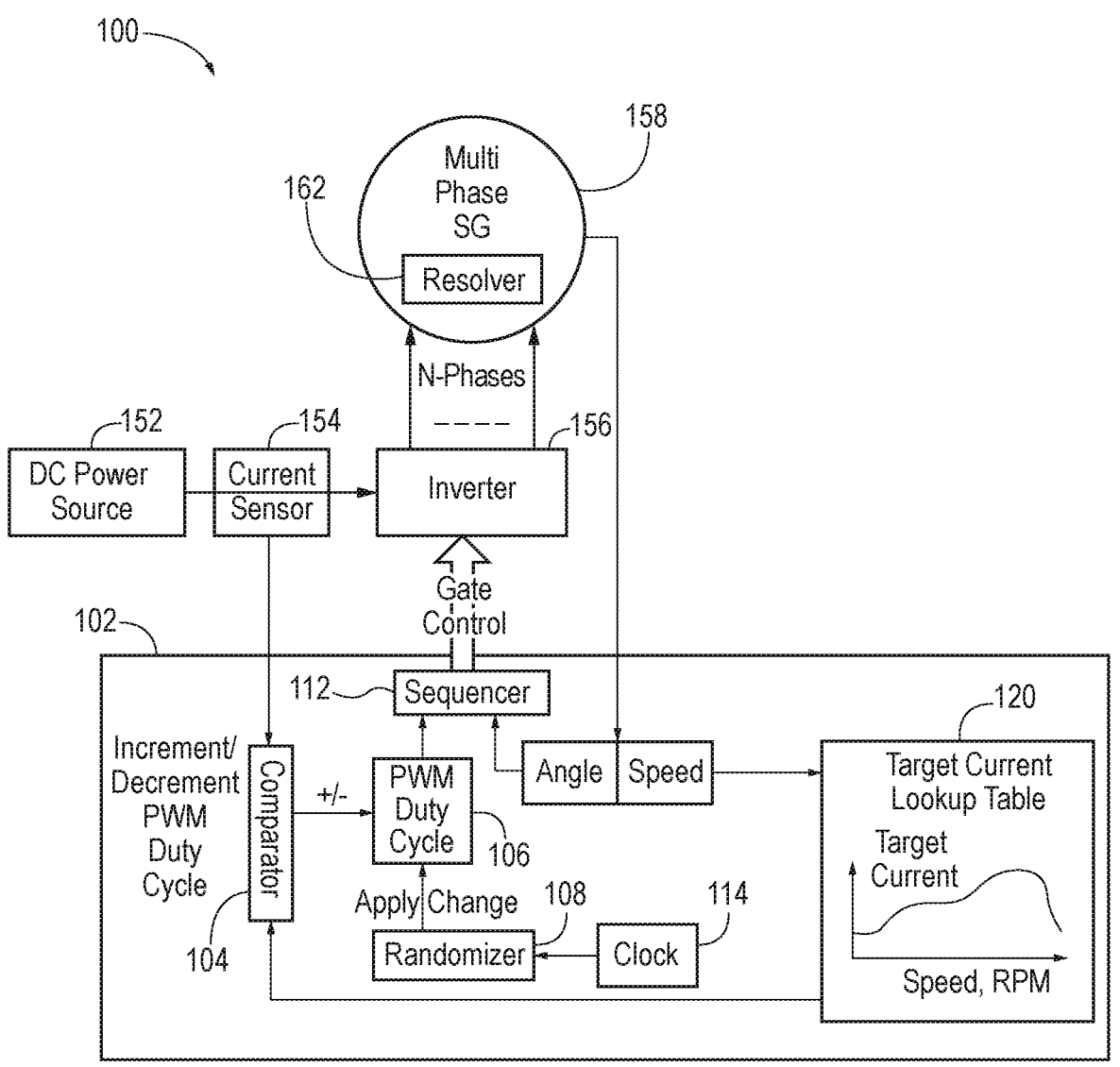
FIG. 1 is an exemplary component diagram of a system for starter-generator control unit (SGCU) randomized current feedback control, according to one aspect.

FIG. 1 is an exemplary component diagram of a system 100 for starter-generator control unit (SGCU) randomized current feedback control, according to one aspect. The system 100 for SGCU randomized current feedback control may control the brushless SG during an engine start mode. The system 100 for SGCU randomized current feedback control may include a controller 102. The controller 102 may include a comparator 104, a pulse width modulation (PWM) duty cycle generator 106, a randomizer 108, a sequencer 112, and a clock 114.

In FIG. 1, it can be seen that a direct current (DC) power source 152 provides DC power to an inverter 156 which drives a multi-phase starter-generator (SG) 158 which may be associated with N number of phases. The system 100 for SGCU randomized current feedback control may include the controller 102 or a SGCU which controls the inverter 156. For example, the system 100 for SGCU randomized current feedback control may control the brushless SG 158 during the engine start mode by controlling the current from the DC power source 152 provided to the inverter 156.

A current sensor 154 may measure a current associated with the DC power source 152 and provide this measurement as an input for the controller 102. Additionally, the multi-phase SG 158 may provide positional angle and rotational speed (e.g., time derivative of the positional angle) as an input to the controller 102 via a resolver 162 of the multi-phase SG. The rotational speed may be a time derivative of a positional angle associated with the SG. The SG 158 may include the resolver 162 determining the positional angle and/or rotational speed. In other words, as the SG 158 rotates, the SG-mounted resolver 162 may provide positional angle and the positional angle time derivative or rotational speed to the controller 102. The SGCU may receive a rotational speed associated with the SG 158 driven by the inverter 156.

As seen in FIG. 1, a closed loop control system may be utilized to implement the DC source current feedback control. The positional angle may be utilized to control the sequencer 112, and thus, the sequencing of the inverter gate driving signals for the inverter transistors.

Using the positional angle provided by the resolver 162 of the multi-phase SG, the controller 102 may determine a target current via a lookup table, which may be stored in a storage drive 120 of the controller 102. The lookup table may be indicative of a target current given a rotational speed of the multi-phase SG. In this way, the controller 102 may determine the target current value based on the input of positional angle and/or rotational speed and the lookup table. Stated another way, the rotational speed may be used to address the target current lookup table stored in a memory or storage drive 120 of the controller 102 and calculations associated therewith executed by a processor of the controller 102. According to one aspect, the target current value changes with a change in rotational speed within the lookup table. In this way, the controller 102 may regulate the source current by controlling the inverter PWM in a manner such that the power source instant current value is equal to the target current value from the lookup table. The target current from the target current lookup table may be determined by the SGCU based on the rotational speed associated with the SG 158 driven by the inverter 156.

A comparator 104 within the controller 102 may compare the target current value with the current associated with the DC power source 152 provided by the DC source current sensor output. The comparator 104 may determine whether to increase or decrease a current value of a PWM duty cycle. The comparator 104 may determine whether to increase or decrease the current value of the PWM duty cycle based on the need to increase or decrease the inverter input current. For example, each time a current correction is determined, the PWM duty cycle may be incremented or decremented by the same amount. The comparator 104 may receive a current reading from the current sensor 154 and a target current from a target current lookup table (e.g., which may be stored in the storage drive 120 or received by the controller 102 according to other aspects) and generate an output comparator signal indicative of an increase or a decrease in a current value of a PWM duty cycle based on a comparison between the current reading and the target current.

The increment or decrement control loop may be run until PWM adjustments result in a match between the controlled variable (e.g., target current from the lookup table) and the measured feedback value (e.g., current measured from the current sensor 154).

A randomizer 108 within the controller 102 may generate a randomly time-varying update signal (based on the clock 114) which may be fed to a PWM duty cycle generator 106, indicating when to update the pulse width with the new adjustment from the comparator 104. The controller 102 for SGCU randomized current feedback control may include the clock 114 driving the randomizer 108. The clock 114 may be a pseudo-random clock.

The PWM duty cycle generator 106 may receive the randomly time-varying update signal and the randomly time-varying update signal may control a cycle time associated with the PWM duty cycle generator 106. The PWM duty cycle generator 106 may receive the signal from the comparator 104 and generate an output PWM signal. The output of the PWM duty cycle generator 106 provides the sequencer 112 with a resulting pulse width, which in turn, changes an amount of current drawn from the DC source. Use of the randomized feedback correction mitigates the starter-generator or SG 158 from resonating and producing undesirable torque ripple during the speed acceleration.

The sequencer 112 may receive the output PWM signal and generate a gate control signal for controlling an inverter 156 based on the output PWM signal. The sequencer 112 may receive a positional angle associated with the SG 158 driven by the inverter 156 and generates the gate control signal for controlling the inverter 156 based on the positional angle.

According to one aspect, the randomizer 108 may vary a frequency associated with how often a battery current value is updated. For example, a control pulse may be provided which enables a change in the updating of the battery current value. A battery current feedback signal (e.g., battery_current_feedback_logic) may be implemented to control field-programmable gate array (FPGA) design for the system 100 for SGCU randomized current feedback control. The battery current feedback signal may be provided such that if over a midpoint, reduce the current and if under the midpoint, increase the current by an incremental amount (e.g., +/−1 incremental amount or unit for each sample period).

Examples of such variation may include waiting 1 ms until the next update, waiting 2 ms until the next update, waiting 3 ms until the next update, waiting 4 ms until the next update, etc. The randomizer 108 may control the cycle time of the control pulse to vary from cycle to cycle. This may be achieved, for example, using a pseudo-random number generator within the randomizer 108. The randomizer 108 may include a state machine which controls the sequencer 112. For example, an output signal of the pseudorandom number generator (e.g., prng_to_start_batt-_curr_fb_correction) may be utilized by a firmware block sm_battery_current_feedback, which may be a state machine which acts as a controller 102 for the sequencer 112 of the battery current feedback algorithm.

In this way, mechanical and/or electrical resonance during engine starts or SG 158 speed acceleration caused by control loop adjustments may be mitigated or avoided. Starter torque ripple may be substantially reduced, thereby improving the reliability of the system 100 for SGCU randomized current feedback control.

Figure 2:
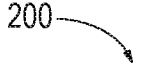
FIG. 2 is an exemplary flow diagram of a method for starter-generator control unit (SGCU) randomized current feedback control, according to one aspect.
Figure 2:
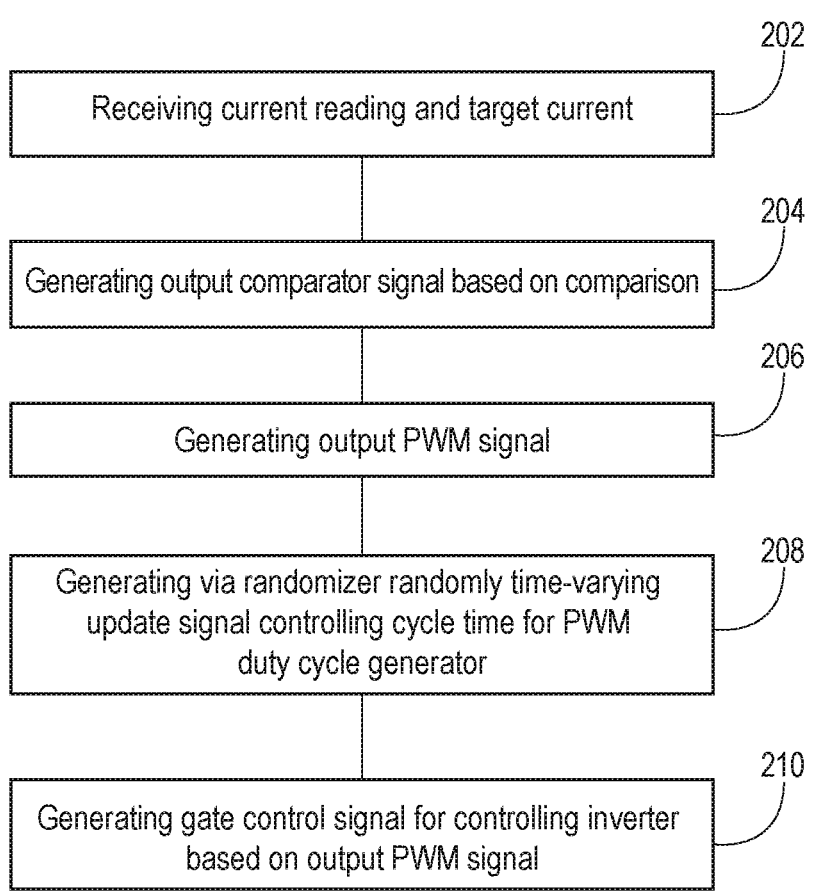

FIG. 2 is an exemplary flow diagram of a method 200 for SGCU randomized current feedback control, according to one aspect. The method 200 for starter-generator control unit randomized current feedback control may include receiving 202, using a comparator, a current reading from a current sensor and a target current from a target current lookup table and generating 204 an output comparator signal indicative of an increase or a decrease in a current value of a pulse width modulation (PWM) duty cycle based on a comparison between the current reading and the target current, receiving, using a PWM duty cycle generator 106, the signal from the comparator and generating 206 an output PWM signal, generating 208, using a randomizer, a randomly time-varying update signal, and receiving, using the PWM duty cycle generator 106, the randomly time-varying update signal. The randomly time-varying update signal may control a cycle time associated with the PWM duty cycle generator 106. The method 200 may include receiving, using a sequencer, the output PWM signal and generating 210 a gate control signal for controlling the inverter based on the output PWM signal.

Again, implementation of the method 200 for SGCU randomized current feedback control may mitigate mechanical and/or electrical resonant coupling during starting engine acceleration by using a random time base for an application of a feedback loop correction to the starter-generator or SG controller during the start mode.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A starter-generator control unit, comprising:
a comparator configured to receive a current reading from a current sensor and a target current from a target current lookup table and further configured to generate an output comparator signal indicative of an increase or a decrease in a current value of a pulse width modulation (PWM) duty cycle based on a comparison between the current reading and the target current;
a PWM duty cycle generator configured to receive the signal from the comparator and generate an output PWM signal;
a randomizer configured to generate a randomly time-varying update signal, wherein;
the PWM duty cycle generator is further configured to receive the randomly time-varying update signal,
the randomly time-varying update signal is configured to control a cycle time associated with the PWM duty cycle generator; and
the randomizer is configured to vary a frequency associated with a battery current value;
an inverter;
a controller configured to receive a rotational speed associated with a starter-generator driven by the inverter;
a resolver configured to determine the rotational speed, the rotational speed being a time derivative of a positional angle associated with the starter generator; and
a sequencer configured to receive the output PWM signal and the rotational speed, for the inverter, associated with the starter-generator and generate a gate control signal for controlling the inverter based on the output PWM signal, wherein the randomly time-varying update signal is configured to attenuate a resonance frequency of the starter-generator during acceleration.

2. The starter-generator control unit of claim 1, comprising a clock driving the randomizer.

3. The starter-generator control unit of claim 2, wherein the clock is a pseudo-random clock.

4. The starter-generator control unit of claim 1, wherein the sequencer is configured to receive a positional angle associated with the starter-generator driven by the inverter and generate the gate control signal for controlling the inverter based on the positional angle.

5. The starter-generator control unit of claim 1, wherein the starter-generator control unit is configured to receive the rotational speed associated with the starter-generator driven by the inverter.

6. The starter-generator control unit of claim 5, wherein the target current from the target current lookup table is determined by the starter-generator control unit based on the rotational speed associated with the starter-generator driven by the inverter.

7. The starter-generator control unit of claim 5, wherein the starter-generator comprises the resolver configured to determine the rotational speed.

8. The starter-generator control unit of claim 1, wherein the inverter is associated with N number of phases.

9. The starter-generator control unit of claim 1, wherein the output comparator signal is associated with an increment or a decrement.

10. A system for starter-generator control unit randomized current feedback control, comprising:

a comparator configured to receive a current reading from a current sensor and a target current from a target current lookup table and generate an output comparator signal indicative of an increase or a decrease in a current value of a pulse width modulation (PWM) duty cycle based on a comparison between the current reading and the target current;

a PWM duty cycle generator configured to receive the signal from the comparator and generate an output PWM signal;

a randomizer configured to generate a randomly time-varying update signal, wherein:

the PWM duty cycle generator is configured to receive the randomly time-varying update signal;

the randomly time-varying update signal is configured to control a cycle time associated with the PWM duty cycle generator; and the randomizer is configured to vary a frequency associated with a battery current value;

an inverter;

a controller configured to receive a rotational speed associated with the starter-generator driven by the inverter;

a resolver configured to determine the rotational speed, the rotational speed being a time derivative of a positional angle associated with the starter generator; and a sequencer configured to receive the output PWM signal and the rotational speed associated with a starter-generator for the inverter and generate a gate control signal for controlling the inverter based on the output PWM signal, wherein the randomly time-varying update signal is configured to attenuate a resonance frequency of the starter generator during acceleration.

11. The system for starter-generator control unit randomized current feedback control of claim 10, comprising a clock driving the randomizer.

12. The system for starter-generator control unit randomized current feedback control of claim 11, wherein the clock is a pseudo-random clock.

13. The system for starter-generator control unit randomized current feedback control of claim 10, wherein the sequencer is configured to receive a positional angle associated with the starter-generator driven by the inverter and generate the gate control signal for controlling the inverter based on the positional angle.

14. The system for starter-generator control unit randomized current feedback control of claim 10, wherein the target current from the target current lookup table is determined by the starter-generator control unit based on the rotational speed associated with the starter-generator driven by the inverter.

15. The system for starter-generator control unit randomized current feedback control of claim 10, wherein the inverter is associated with N number of phases.

16. A method for starter-generator control unit randomized current feedback control, comprising:

receiving, using a comparator, a current reading from a current sensor and a target current from a target current lookup table and generating an output comparator signal indicative of an increase or a decrease in a current value of a pulse width modulation (PWM) duty cycle based on a comparison between the current reading and the target current;

receiving, using a PWM duty cycle generator, the signal from the comparator and generating an output PWM signal;

generating, using a randomizer, a randomly time-varying update signal, wherein:

the PWM duty cycle generator receives the randomly time-varying update signal;

the randomly time-varying update signal controls a cycle time associated with the PWM duty cycle generator; and the randomizer is configured to vary a frequency associated with a battery current value;

determining, using a resolver, a rotational speed, the rotational speed being a time derivative of a positional angle associated with a starter generator; and receiving, using a sequencer, the output PWM signal and the rotational speed associated with a starter-generator driven by an inverter and generating a gate control signal for controlling the inverter based on the output PWM signal, wherein the randomly time-varying update signal attenuates a resonance frequency of the starter-generator.

17. The method of claim 16, further comprising:

controlling, by the randomizer, a control pulse to update the frequency associated with the battery current value.

18. The method of claim 17, further comprising:

receiving, at the randomizer, a battery current feedback signal, wherein the frequency is based at least in part on the battery current feedback signal.

19. The method of claim 18, further comprising:

determining that the battery current feedback signal is above a midpoint or below the midpoint, wherein:

if the battery current feedback signal is above the midpoint, reducing current provided to the battery by an incremental amount; or if the battery current feedback signal is below the midpoint, increasing the current provided to the battery by the incremental amount.

20. The method of claim 19, wherein the randomizer controls the control pulse to update to a first battery current value during a first cycle to a second battery current value during a second cycle.

* * * * *